United States Patent [19]

Usuki et al.

[11] Patent Number: 5,869,186
[45] Date of Patent: *Feb. 9, 1999

[54] MAGNETIC RECORDING MEDIUM

[75] Inventors: Kazuyuki Usuki; Kunihiko Sano; Toshio Ishida, all of Odawara, Japan

[73] Assignee: Fuji Photo Film Co., Ltd., Kanagawa, Japan

[*] Notice: The term of this patent shall not extend beyond the expiration date of Pat. No. 5,707,742.

[21] Appl. No.: 865,830

[22] Filed: May 30, 1997

Related U.S. Application Data

[63] Continuation of Ser. No. 523,807, Sep. 5, 1995, abandoned.

[30] Foreign Application Priority Data

Sep. 5, 1994 [JP] Japan .................................. 6-211339

[51] Int. Cl.$^6$ ...................................................... G11B 5/71
[52] U.S. Cl. .................. 428/421; 428/457; 428/694 TF; 428/694 TC; 428/694 TB; 428/900
[58] Field of Search ....................... 428/694 TF, 694 TC, 428/694 TB, 457, 421, 900

[56] References Cited

U.S. PATENT DOCUMENTS

| | | | |
|---|---|---|---|
| 4,536,444 | 8/1985 | Sumiya et al. ........................... | 428/340 |
| 5,091,269 | 2/1992 | Kondo et al. ............................ | 428/695 |
| 5,268,227 | 12/1993 | Nishikawa et al. ..................... | 428/336 |
| 5,374,480 | 12/1994 | Nishikawa et al. ..................... | 428/336 |
| 5,395,696 | 3/1995 | Ishida et al. ............................. | 428/408 |
| 5,431,833 | 7/1995 | Kondo et al. ........................... | 252/54.6 |
| 5,453,539 | 9/1995 | Kondo et al. ............................ | 562/586 |
| 5,498,457 | 3/1996 | Ishihara et al. ......................... | 428/65.4 |

FOREIGN PATENT DOCUMENTS 06124432  5/1994  Japan .

*Primary Examiner*—Stevan A. Resan
*Attorney, Agent, or Firm*—Sughrue, Mion, Zinn, Macpeak & Seas, PLLC

[57] ABSTRACT

A magnetic recording medium excellent in running properties, durability and shelf stability. The magnetic recording medium has a magnetic layer of a ferromagnetic metal thin film formed over at least one surface of a non-magnetic base, with or without an inorganic protective layer formed on the magnetic layer. A surface layer consisting essentially of a salt of a phosphoric alkyl ester compound with an alkylamine compound, which is represented by the following formula (1) or (2), and a fluorine-containing carboxylic acid ester compound is provided on the magnetic layer or on the inorganic protective layer:

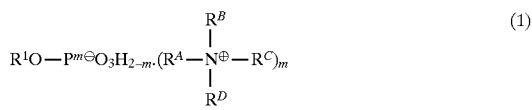

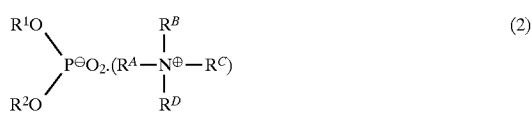

where: $R^1$ and $R^2$, which may be the same or different from each other, are a hydrocarbon or fluorinated hydrocarbon group having from 2 to 26 carbon atoms; $R^A$, $R^B$, $R^C$ and $R^D$ are hydrogen, or a hydrocarbon or fluorinated hydrocarbon group having not more than 26 carbon atoms; and m is 1 or 2.

2 Claims, No Drawings

MAGNETIC RECORDING MEDIUM

This is a Continuation of application Ser. No. 08/523,807 filed Sep. 5, 1995 now abandoned.

BACKGROUND OF THE INVENTION

The present invention relates to a magnetic recording medium having a ferromagnetic metal thin film as a magnetic layer. More particularly, the present invention relates to a ferromagnetic metal thin film type magnetic recording medium which is made excellent in running properties, durability and shelf stability by specifying the structure and composition of a lubricant which is to be present on a protective film formed on the magnetic layer.

Magnetic recording mediums, e.g. magnetic tapes, floppy disks, etc., are commonly coated at the magnetic layer surface thereof with a lubricant to improve lubrication between the magnetic recording medium and the magnetic head and to enhance the running durability of the magnetic recording medium.

With the achievement of high recording density, the magnetic layer surfaces of magnetic recording mediums have become smoother. Further, magnetic recording mediums are used under various environmental conditions, and information recorded thereon are usually stored for a long period of time ranging from several years to several tens of years. Accordingly, magnetic recording mediums are demanded to have running durability and shelf stability under a wide variety of environmental conditions. Under these circumstances, conventional lubricants have become unable to exhibit satisfactory effect.

Further, small-sized video tape recorders such as cam coders, i.e. video tape recorders having a camera integrated therewith, and 8-mm video tape recorders are often used outdoor. Therefore, magnetic recording mediums are demanded to endure use in a wide range of environmental conditions.

To improve the density of magnetic recording on video tapes and magnetic disks in conformity to future developments of high-definition television, digital recording, etc., metal thin film type magnetic recording mediums which use a ferromagnetic metal thin film as a magnetic layer, and which are useful for high-density recording have been expected. However, in a metal thin film type magnetic recording medium, the magnetic layer is protected by only an extremely thin metallic oxide layer. Therefore, it has been demanded to provide a lubricant layer material which is capable of not only ensuring running properties and durability but also markedly improving shelf stability of ferromagnetic metal thin film type magnetic recording mediums.

In particular, ferromagnetic metal thin film type magnetic recording mediums are being improved so as to enable achievement of higher-density recording by smoothing the surface and also changing the composition of the magnetic layer from CoNi—O to Co—O or Co—Fe that contains Co—O, etc. so as to attain high Bm. With the conventional metal thin film type magnetic recording mediums that have a high cobalt content, however, it has heretofore been difficult to obtain stable running properties, favorable durability and corrosion resistance.

Hydrocarbon- or fluorine-containing lubricants which have various structures, and which are excellent in lubricating performance have been examined as being lubricants for metal thin film type magnetic recording mediums, and it is known that an organic fluorine compound having a hydrophilic functional group in a molecule thereof is capable of improving running durability to a considerable extent.

However, even if a lubricant having excellent characteristics is used, a smooth metal thin film type magnetic recording medium having improved electromagnetic transducing characteristics suffers from the problem that the lubricant attached to the surface of the magnetic layer is gradually lost because of repeated sliding movement, resulting in deterioration of the characteristics.

One approach that has heretofore been made to improve the characteristics is to use a lubricant having various polar groups in a molecule thereof. For example, Japanese Patent Application Unexamined Publication Number [hereinafter referred to as "JP(A)"] 59-119537 and Japanese Patent Application Post-Examination Publication Number [hereinafter referred to as "JP(B)"] 4-50644 disclose a technique in which a carboxylic acid, an ester, a phosphoric ester, etc. are used. JP(A) 4-274017 and 4-372716 disclose the use of an alkylamine salt of a carboxylic acid and an alkylamine salt of phosphonic acid. However, the disclosed techniques involve the problem that repeated running durability at low temperature is inferior. Accordingly, there have also been made many studies to improve the characteristics by using two or more different kinds of lubricant in combination.

JP(A) 62-141625 discloses the use of a carboxylic acid and a fluorine-containing ester in combination. With this method, the repeated running durability at low temperature can be markedly improved in comparison to a case where each lubricant is used alone. However, the magnetic recording medium using a carboxylic acid and a fluorine-containing ester in combination has the problem that it is inferior in corrosion resistance, particularly shelf stability under high-temperature and high-humidity environmental conditions.

Further, JP(A) 4-205712 proposes a method in which a lubricant layer is formed from two different kinds of lubricant, and in which the amounts of lubricant at the magnetic layer side and at the back coat layer side are specified. With this method, however, no satisfactory lubricating properties can be obtained.

JP(A) 57-29767, 58-188326, 60-63711, 60-63712, 62-209718 and 01-211215 disclose a method in which a lubricant is applied to a back coat layer provided on the side of a magnetic recording medium which is reverse to the side thereof on which a magnetic layer is formed, thereby enabling the lubricant to be appropriately supplied from the back coat layer to the magnetic layer surface where the lubricant is gradually lost by sliding movement. Such a coating method enables an improvement in repeated running durability. However, when a lubricant is coated on only the back coat layer, durability is difficult to ensure; when a lubricant is coated on both the back coat layer and the magnetic layer, a surplus of lubricant is inevitably present on the magnetic layer. Consequently, the coefficient of static friction rises, giving rise to problems such as undesired sticking of the magnetic recording medium.

In terms of corrosion resistance, which is a problem in practical use of magnetic recording mediums that use a ferromagnetic metal thin film as a magnetic layer, the required corrosion resistance cannot sufficiently be ensured by only a fluorine-containing lubricant having a polar group in a molecule thereof. Accordingly, it has been proposed to use such a lubricant in combination with a rust preventive. However, it has heretofore been difficult to ensure the required corrosion resistance by the combined use of a lubricant and a rust preventive that are selected from those which are generally known.

Under these circumstances, attempts have recently been made to improve durability and corrosion resistance by providing a protective film on the magnetic layer of a magnetic tape as well as a magnetic disk. Among various protective films, a carbon film, which is represented by a diamond-like carbon film, has become of major interest as a protect film because it has a high hardness and is unlikely to seize to a sliding member under all environmental conditions. However, when such a carbon protective film is used alone, the coefficient of friction is raised by repeated sliding movement, resulting in breakage of the film. Therefore, it is a common practice to coat a lubricant having a polar group on the protective film. For example, JP(A) 5-151559 discloses a magnetic recording medium in which a long-chain alkylsilane compound is applied to the surface of a carbon protective film. However, under low-temperature and low-humidity environmental conditions, the required lubricating performance cannot satisfactorily be ensured by only a long-chain alkylsilane compound, and it is likely that the protective film will be broken as a result of the rise of the friction coefficient.

Thus, it has been demanded to develop a magnetic recording medium which has the coefficient of friction stabilized at a low level, and which is excellent in still durability, repeated running durability and corrosion resistance and capable of high-density magnetic recording in particular.

SUMMARY OF THE INVENTION

The present invention provides a magnetic recording medium having a magnetic layer of a ferromagnetic metal thin film formed over at least one surface of a non-magnetic base, in which a surface layer consisting essentially of a salt of a phosphoric alkyl ester compound with an alkylamine compound, which is represented by the following formula (1) or (2), and a fluorine-containing carboxylic acid ester compound is present over the ferromagnetic metal thin film:

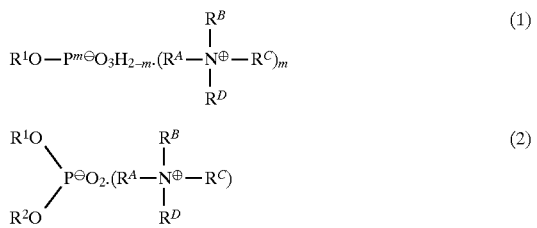

where: $R^1$ and $R^2$, which may be the same or different from each other, are a hydrocarbon or fluorinated hydrocarbon group having from 2 to 26 carbon atoms; $R^A$, $R^B$, $R^C$ and $R^D$ are hydrogen, or a hydrocarbon or fluorinated hydrocarbon group having not more than 26 carbon atoms; and m is 1 or 2.

In the above-described magnetic recording medium, the surface layer may be formed on a protective layer provided on the ferromagnetic metal thin film.

In the above-described magnetic recording medium, a back coat layer may be provided on the side of the non-magnetic base which is reverse to the side on which the ferromagnetic metal thin film is provided. The back coat layer contains the above-described fluorine-containing carboxylic acid ester compound.

The above-described magnetic recording medium may be arranged such that the surface layer is formed on a protective layer provided on the ferromagnetic metal thin film, and that a back coat layer containing the above-described fluorine-containing carboxylic acid ester compound is provided on the side of the non-magnetic base which is reverse to the side on which the ferromagnetic metal thin film is provided.

In the above-described magnetic recording medium, the fluorine-containing carboxylic acid ester compound is selected from the group consisting of compounds which are represented by the following formulae (3) to (6):

where: $R^3$ and $R^4$, which may be the same or different from each other, are a hydrocarbon group having from 8 to 26 carbon atoms; at least either one of $R^3$ and $R^4$ is a fluorinated hydrocarbon group in which some or all of hydrogen atoms have been replaced by fluorine atoms; $R^5$ is a hydrocarbon group having from 8 to 26 carbon atoms; $R^6$ is a hydrocarbon group having from 2 to 18 carbon atoms; at least either one of $R^5$ and $R^6$ is a fluorinated hydrocarbon group in which some or all of hydrogen atoms have been replaced by fluorine atoms; $R^7$ is a straight-chain or branched alkylene group having from 1 to 4 carbon atoms; n is an integer of from 1 to 18; Rf is a perfluoro polyether group having a molecular weight of from 1,000 to 3,000; and $R^8$ is a hydrocarbon group having from 8 to 28 carbon atoms.

DESCRIPTION OF THE PREFERRED EMBODIMENT

The present invention is a magnetic recording medium having a magnetic layer of a ferromagnetic metal thin film formed over at least one surface of a non-magnetic base, with or without an inorganic protective film stacked on the magnetic layer, in which a surface layer consisting essentially of a salt of a phosphoric alkyl ester compound with an alkylamine compound, and a fluorine-containing carboxylic acid ester compound is present on the ferromagnetic metal thin magnetic film or on the inorganic protective film.

In the magnetic recording medium of the present invention, the salt of a phosphoric alkyl ester compound with an alkylamine compound is considered to be capable of performing extreme pressure lubrication under severe sliding conditions because it is readily adsorbed on a protective film, e.g. a carbon protective film, and it has a phosphoric acid group in a molecule thereof. Therefore, it is possible to improve the durability and corrosion resistance of the magnetic recording medium. Further, the magnetic recording medium suffers minimal deterioration of the running durability after storage under high-temperature and high-humidity environmental conditions in comparison to a magnetic recording medium which uses only a phosphoric alkyl ester compound, and thus high reliability can be obtained. The reason for this is considered as follows: Even if the phosphoric alkyl ester compound in the salt is hydrolyzed under high-temperature and high-humidity environmental conditions, the alkylamine compound is not hydrolyzed, and thus it contributes to lubrication.

Further, by using the above-described fluorine-containing carboxylic acid ester compound in combination with the salt of a phosphoric alkyl ester compound with an alkylamine compound, it is possible to obtain fluid lubricating properties based on the behavior of non-adsorption molecules on the adsorption film of the salt. The advantageous effect is particularly remarkable under low-temperature and low-humidity environmental conditions.

As has been described above, the magnetic recording medium of the present invention uses both a salt of a phosphoric alkyl ester compound with an alkylamine compound, and a fluorine-containing carboxylic acid ester compound, thereby enabling these compounds to exhibit their advantages even more satisfactorily than in a case where each compound is used alone.

A significant feature of the present invention resides in that still durability and repeated running durability can be improved to such a considerable extent as cannot be expected from the characteristics of each of the compounds.

In the magnetic recording medium of the present invention, further, a back coat layer is provided on the side of the magnetic recording medium which is reverse to the side thereof on which the magnetic layer is provided, and the above-described fluorine-containing carboxylic acid ester is allowed to be present in the back coat layer or on the surface thereof, thereby enabling the lubricant to be transferred from the back coat layer to the magnetic layer surface, where the lubricant is gradually lost by sliding of the medium surface on a magnetic head and guide poles, when the tape-shaped medium is wound up. Thus, the magnetic layer can be replenished with lubricant. Accordingly, it is possible to obtain excellent repeated running durability.

Accordingly, the features of the magnetic recording medium of the present invention can be effectively utilized when the magnetic recording medium has a tape-like shape.

In the present invention, particularly excellent running durability and corrosion resistance can be attained when the salt of a phosphoric alkyl ester compound with an alkylamine compound and the fluorine-containing carboxylic acid ester compound, which constitute the magnetic recording medium of the present invention, have the following structures.

First, the salt preferably has either of the following structures:

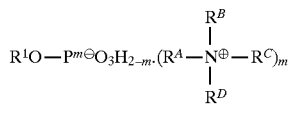

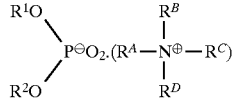

where: $R^1$ and $R^2$, which may be the same or different from each other, are a hydrocarbon or fluorinated hydrocarbon group having from 2 to 26 carbon atoms; $R^A$, $R^B$, $R^C$ and $R^D$ are hydrogen, or a hydrocarbon or fluorinated hydrocarbon group having not more than 26 carbon atoms; and m is 1 or 2.

In the compound of formula (1) or (2), if the number of carbon atoms in $R^1$ or $R^2$ is less than 2, sufficiently high wear resistance cannot be obtained. In addition, since the volatility of the compound becomes undesirably high, the compound cannot exhibit satisfactory characteristics. If the number of carbon atoms is more than 26, the solubility of the compound in a solvent reduces, or the adsorption characteristics of the compound to the magnetic layer or the protective film degrade, unfavorably. It is particularly preferable that the number of carbon atoms should be in the range of from 6 to 20.

$R^A$, $R^B$, $R^C$ and $R^D$ are hydrogen, or a hydrocarbon or fluorinated hydrocarbon group having not more than 26 carbon atoms, preferably not more than 20 carbon atoms. These hydrocarbon groups are preferably straight-chain saturated hydrocarbon groups, but they may hydrocarbon groups containing an unsaturated hydrocarbon group, or hydrocarbon groups having a branched structure in which a side chain or a coupling group has been introduced. They may also be fluorinated hydrocarbon groups in which some or all of hydrogen atoms have been replaced by fluorine atoms. These hydrocarbon groups need not be the same. Preferably, any of $R^A$, $R^B$, $R^C$ and $R^D$ is a hydrocarbon group having from 8 to 26 carbon atoms. More preferably the others are hydrocarbon groups having not more than 3 carbon atoms or hydrogen. m is 1 or 2. Preferably, m is 1.

The salt of a phosphoric alkyl ester compound with an alkylamine compound can be obtained by dissolving a phosphoric alkyl ester compound and an alkylamine compound as raw materials in a solvent capable of dissolving both of them, and then vaporizing the solvent. It is also possible to allow the salt to be present on the surface of a magnetic layer as a surface layer by coating an alkylamine compound on the magnetic layer surface, and then coating a phosphoric alkyl ester compound on the alkylamine compound coating.

If the number of carbon atoms is excessively small, no favorable protective effect can be obtained, whereas, if it is excessively large, crystallizability increases, causing the coatability to reduce. As a result, the lubricating effect deteriorates, unfavorably.

Specific salts of a phosphoric alkyl ester compound with an alkylamine compound usable in the magnetic recording medium of the present invention include:

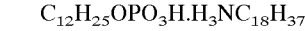
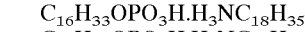
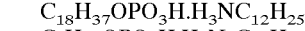
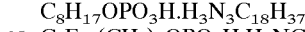
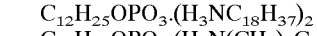
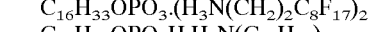
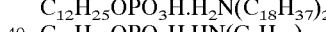
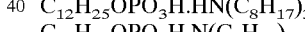
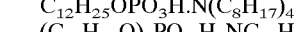
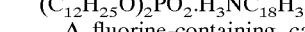

A fluorine-containing carboxylic acid ester compound which is used in combination with a salt of a phosphoric alkyl ester compound with an alkylamine compound is an ester of a carboxylic acid and an alcohol, which is a compound containing a fluorine atom in a molecule thereof. It is particularly preferable to use a fluorine-containing carboxylic acid ester compound having a molecular structure represented by any of the above formulae (3) to (6).

In the formulae (3) to (6), $R^3$ and $R^4$, which may be the same or different from each other, are a hydrocarbon group having from 8 to 26 carbon atoms. At least either one of $R^3$ and $R^4$ is a fluorinated hydrocarbon group in which some or all of hydrogen atoms have been replaced by fluorine atoms. $R^5$ is a hydrocarbon group having from 8 to 26 carbon atoms, and $R^6$ is a hydrocarbon group having from 2 to 18 carbon atoms. At least either one of $R^5$ and $R^6$ is a fluorinated hydrocarbon group in which some or all of hydrogen atoms have been replaced by fluorine atoms. $R^7$ is a straight-chain or branched alkylene group having from 1 to 4 carbon atoms. n is an integer of from 1 to 18. Rf is a perfluoro polyether group having a molecular weight of from 1,000 to 3,000. $R^8$ is a hydrocarbon group having from 8 to 28 carbon atoms.

Each of the fluorine-containing carboxylic acid ester compounds will be explained below.

In the compound $R^3$—COO—$R^4$ of formula (3), $R^3$ and $R^4$ may be the same or different from each other. $R^3$ and $R^4$ are hydrocarbon groups having from 8 to 26 carbon atoms. At least either one of $R^3$ and $R^4$ is a fluorinated hydrocarbon group in which some or all of hydrogen atoms have been replaced by fluorine atoms. The number of carbon atoms is preferably in the range of from 8 to 20, more preferably from 8 to 18. If the number of carbon atoms in $R^3$ or $R^4$ is smaller than 8, no favorable lubricating properties can be obtained, whereas, if it is excessively large, crystallizability increases, making it impossible to realize uniform coating.

Further, in order to suppress the volatility of the lubricant and obtain favorable lubricating effect, it is preferable that at least either one of the two carbon chains in the molecule should have 10 or more carbon atoms. Preferably, $R^3$ and $R^4$ are each a saturated hydrocarbon or saturated fluorinated hydrocarbon group, which may have an unsaturated bond or a branched structure in the carbon chain thereof. The use of such an ester makes it possible to expect that the melting point will lower, and thus the fluid lubricating properties will improve.

Specific examples of the above-described fluorine-containing carboxylic acid ester compound are as follow:

$C_8F_{17}COOC_{18}H_{37}$
$C_8F_{17}(CH_2)_2COOC_{18}F_{37}$
$C_{17}F_{35}COO(CH_2)_2C_8F_{17}$
$C_{17}F_{33}COO(CH_2)_2C_8F_{17}$
$C_{17}F_{31}COO(CH_2)_2C_8F_{17}$
$C_8F_{17}(CH_2)_{10}COO(CH_2)_{10}C_8F_{17}$

In the compound $R^5$—COO—$(R^7O)_n$—$R^6$ of formula (4), $R^5$ is a hydrocarbon group having from 8 to 26 carbon atoms, and $R^6$ is a hydrocarbon group having from 2 to 18 carbon atoms. At least either one of $R^5$ and $R^6$ is a fluorinated hydrocarbon group in which some or all of hydrogen atoms have been replaced by fluorine atoms. $R^7$ is a straight-chain or branched alkylene group having from 1 to 4 carbon atoms. n is an integer of from 1 to 18. The compound of formula (4) is formed by introducing an alkylene oxide group into the compound of formula (3). By virtue of the presence of the alkylene oxide group, the melting point of the ester lowers, and thus the uniformity of the coating film improves, and at the same time, running durability at low temperature is improved. A compound of formula (3) which has an unsaturated bond introduced into a carbon chain thereof improves durability at low temperature in the same way as the compound of formula (4). However, in comparison to such a compound of formula (3), the compound of formula (4) is hardly hydrolyzed, and thus exhibits favorable shelf stability.

The following are specific examples of compounds of formula (4):

$C_8F_{17}COO(CH_2CH_2O)_2C_{12}H_{25}$
$C_6F_{13}C_8H_{16}COO(CH_2CH_2O)_6C_2H_4C_4F_9$
$C_8F_{17}C_{14}H_{29}COO(C_6H_{12}O)C_8H_{17}$
$C_8F_{17}COO(C_4H_8O)C_4H_8CH(CH_3)C_8H_{17}$
$(CF_3)_2CFC_{10}H_{20}COO(C_6H_{12}O)_4C_{14}H_{29}$
$C_8F_{17}C_2H_4COO(C_8H_{16}O)_2C_5H_{10}CF(CF_3)_2$

In the compounds of formulae (5) and (6):

Rf—COO—$R^8$     (5)

$R^8$—COO—$CH_2$—Rf     (6)

Rf is a perfluoro polyether group having a molecular weight of from 1,000 to 3,000, and $R^8$ is a hydrocarbon group having from 8 to 28 carbon atoms. If the molecular weight is less than 1,000, it becomes impossible to obtain excellent fluid lubricating properties characteristic of perfluoro polyethers, whereas, if the molecular weight exceeds 3,000, the static coefficient of friction is caused to rise, and it becomes likely that running failure or head crash will occur. Examples of Rf include perfluoromethylene oxide polymer $(CF_2O)_n$, perfluoroethylene oxide polymer $(CF_2CF_2O)_n$, perfluoro-n-propylene oxide polymer $(CF_2CF_2CF_2O)_n$, perfluoroisopropylene oxide polymer $(CF(CF_3)CF_2O)_n$, and copolymers of these polymers. Specific examples of usable perfluoro polyethers are KRYTOX, manufactured by Du Pont Co., Ltd., FOMBLIN, manufactured by Montefluos, DEMNUM, manufactured by Daikin Kogyo Co., Ltd., and so forth. The compound of formula (5) is an esterification product formed by reaction between a perfluoro polyether having a carboxyl group at a terminal thereof and an aliphatic alcohol. The compound of formula (6) is an esterification product formed by reaction between a fatty acid and a perfluoro polyether having a hydroxyl group at a terminal thereof.

From the viewpoint of production cost and environmental protection, the above-described esters are preferably dissolved in an ordinary organic solvent. For this purpose, it is preferable to use a compound which has a hydrocarbon chain containing no fluorine at one ester linkage, or to adjust the proportion of the alkyl portion of the fluoroalkyl group to the perfluoroalkyl group so that the solubility is improved. When an ester which has high crystallizability and a high melting point is used, precipitation may occur on the surface of the magnetic layer or on the surface of the back coat layer. Therefore, it is preferable to use an ester having a melting point of 30° C. or lower when the lubricating properties at low temperature are further taken into consideration.

In the magnetic recording medium of the present invention, a surface layer of a compound according to the present invention can be formed on the magnetic layer or on the protective film by either an intermix application method in which a salt of a phosphoric alkyl ester compound with an alkylamine compound and a fluorine-containing carboxylic acid ester compound, which are used to form a surface layer, are dissolved in an organic solvent, and the resulting solution is coated on the surface of the magnetic layer or the protective layer, or a successive application method in which after the salt of a phosphoric alkyl ester compound with an alkylamine compound has been coated, the fluorine-containing carboxylic acid ester compound is coated. However, with a view to densely orienting the salt of a phosphoric alkyl ester compound with an alkylamine compound on the surface of the magnetic layer or the protective film, it is preferable to form, first, a lubricant layer of the salt and, thereafter, form a lubricant layer of a fluorine-containing carboxylic acid ester compound.

It is most preferable to employ a method in which, after a solution of a salt of a phosphoric alkyl ester compound with an alkylamine compound in an organic solvent has been coated on the surface of the magnetic layer and dried, a back coat layer containing a fluorine-containing carboxylic acid ester compound is formed, and then the magnetic recording medium is wound up, thereby transferring the fluorine-containing carboxylic acid ester compound contained in the back coat layer to the surface of the protective film.

That is, it is advantageous to retain a relatively large amount of lubricant by a back coat layer, which generally has a much larger number of voids than a ferromagnetic metal thin film, and it is also possible to supply the lubricant, which is gradually lost by sliding movement, from the back coat layer when the magnetic recording medium is wound up. Hitherto, when a fluorine-containing compound is coated directly on the surface of the magnetic layer by using an organic solvent, even if the compound is soluble in the organic solvent, fine coating unevenness and precipitation of the compound are likely to occur during drying after coating. However, with the method in which the lubricant of a fluorine-containing fatty acid ester compound is transferred from the back coat layer, the lubricant can be transferred from the back coat layer to the magnetic layer side by contact when the magnetic recording medium is wound up, by mixing or coating the back coat layer with the lubricant of a fluorine-containing fatty acid ester compound. Therefore, coating unevenness is more unlikely to occur, and precipitation of the lubricant is also more unlikely to occur than in a case where the lubricant is coated directly on the magnetic layer. Accordingly, the number of kinds of lubricant usable advantageously increases.

The back coat layer consists essentially of a non-magnetic powder and a binder resin. As a non-magnetic power, various kinds of inorganic pigment and carbon black can be used. As a binder resin, it is possible to use various kinds of binder resin which are generally employed for coating type magnetic layers, e.g. nitrocellulose, phenoxy resin, vinyl chloride resin, polyurethane, etc.

Since the lubricant compounds of the present invention are soluble in an organic solvent consisting mainly of a hydrocarbon solvent, which is selected from among acetone, methyl ethyl ketone, methyl isobutyl ketone, cyclohexanone, methanol, ethanol, and isopropanol, the compounds can be coated and dried to produce a magnetic recording medium without using a fluorine-containing organic solvent. Thus, since the lubricant compounds can be dissolved in a hydrocarbon solvent, there is no likelihood of causing an environmental problem such as destruction of the ozone layer as in the case of conventional fluorine-containing solvents; this is an exceedingly great advantage in practical use.

In the magnetic recording medium of the present invention, a protective film may be provided on the ferromagnetic metal thin film. The protective film is formed by using an oxide, e.g. silica, alumina, titania, zirconia, cobalt oxide, etc., a nitride, e.g. titanium nitride, a carbide, e.g. chromium carbide, carbon, e.g. graphite, amorphous carbon, etc.

That is, the effect of the lubricant in the present invention is added to the protecting function of the protective film, thus making it possible to realize a magnetic recording medium which satisfactorily endures sliding movement on a magnetic head under severe conditions, and in which the medium surface is free from friction and capable of maintaining the lubricating properties for a long time.

Accordingly, the protective film is preferably a rigid film having a hardness which is equal to or higher than that of the head material. It is most preferable to use a protective film which is unlikely to cause seizing during sliding and whose effect lasts stably. Examples of such a protective film include a rigid carbon film. The rigid carbon protective film is a carbon film having a structure selected from among amorphous, graphite and diamond structures, and a mixture of these structures, which is formed by plasma CVD, sputtering, etc. A rigid carbon film, which is generally known as "diamond-like carbon", is particularly preferable. This carbon film is a rigid carbon film having a Vickers hardness of not lower than 1,000 kg/mm$^2$, preferably not lower than 2,000 kg/mm$^2$. The carbon film has an amorphous crystal structure and is non-electrically conductive. When measured by Raman spectroscopy, the structure of the diamond-like carbon film in the present invention can be confirmed by detecting a peak in the range of from 1,520 to 1,560$^{-1}$ cm. If the structure of the carbon film deviates from the diamond-like structure, the peak that is detected by Raman spectroscopy deviates from the above range, and the hardness of the carbon film also lowers. Thus, it becomes difficult to attain the purpose of the present invention.

The structure of the diamond-like carbon film in the present invention can also be identified by X-ray electron spectroscopy for chemical analysis (ESCA) in addition to Raman spectroscopy. Particularly, when the film structure is identified by ESCA, if the plasmon loss energy for C-ls is 26±1 eV, an even more favorable carbon film is obtained. The term "plasmon loss energy" is herein employed to mean the deviation due to plasmon loss of a peak from the main peak in C-ls spectrum measured by irradiating the carbon film with X-rays, and the deviation is measured by an X-ray electron spectroscope (e.g. PHI-560, manufactured by Perkin-Elmer). As the hardness of the carbon protective film reduces, friction characteristics are improved, but wear resistance becomes insufficient, so that it is impossible to obtain the desired running durability. Particularly, still durability lowers to a considerable extent. The diamond-like carbon protective films can be produced by sputtering or CVD. However, it is preferable to produce them by CVD from the viewpoint of productivity and the stability of quality and also from the viewpoint that favorable wear resistance can be ensured even with an ultra-thin film having a thickness of 10 nm or less. It is particularly preferable that chemical species decomposed by a radio-frequency plasma should be accelerated by applying a bias voltage to the substrate.

There is no particular restriction on the material used to form a carbon protective film, that is, the carbon compound that is formed into a plasma. However, examples include hydrocarbon, ketone and alcohol compounds.

It is particularly preferable to form a rigid carbon protective film by plasma CVD using as a raw material a carbon-containing compound such as an alkane, e.g. methane, ethane, propane, butane, etc., or an alkene, e.g. ethylene, propylene, etc., or an alkyne, e.g. acetylene.

In general, a raw material gas consisting essentially of such a carbon-containing compound is introduced into a plasma generating apparatus at a partial pressure in the range of from 13.3 to 0.133N/m$^2$, preferably from 6.67 to 2.67N/m$^2$. It is also possible to introduce an inert gas, e.g. hydrogen, argon, etc., simultaneously with the above-described raw material gas. In this case, an example of a desirable mixture of gases is a mixture of a hydrocarbon such as methane and argon. In general, the ratio of hydrocarbon to argon is preferably in the range of from 6:1 to 2:1.

If the film thickness of the rigid carbon protective film is excessively large, the electromagnetic transducing characteristics are deteriorated, and the adhesion to the magnetic layer lowers, whereas, if the film thickness is excessively small, the wear resistance becomes insufficient. Therefore, the film thickness is preferably in the range of from 2.5 nm to 20 nm, particularly preferably in the range of from 5 nm to 10 nm.

Further, the surface of the rigid carbon protective film may be treated with an oxidizing or inert gas for the purpose of further improving the adhesion of the rigid carbon protective film to the lubricant applied to the surface thereof.

A ferromagnetic metal thin film which constitutes a magnetic layer in the magnetic recording medium according to the present invention may be formed by a vacuum film forming method, e.g. vacuum deposition, ion plating, sputtering, CVD, etc. The film may be formed in a singlelayer structure, a parallel multilayer structure, a non-parallel multilayer structure, etc. Examples of usable metallic materials are iron, cobalt, nickel, and cobalt-containing alloys, e.g. cobalt-nickel alloy, cobalt-chromium alloy, cobalt-platinum alloy, iron-cobalt alloy, etc.

In the present invention, it is possible to use any magnetic layer which is formed from a known metal or alloy consisting essentially of cobalt by oblique-incidence vacuum deposition in an atmosphere containing a trace of oxygen. To improve electromagnetic transducing characteristics, it is particularly preferable to use Co—O, Co—Fe that contains Co—O, etc., in which not less than 90% of the metal atoms constituting the magnetic layer is cobalt. It is further preferable that not less than 95%, more preferably not less than 97%, of the metal atoms should be cobalt. The thickness of the magnetic layer is preferably in the range of from 100 nm to 300 nm, more preferably from 120 nm to 200 nm.

To improve electromagnetic transducing characteristics, the ferromagnetic metal thin film may be formed in a multilayer structure or may have a non-magnetic primary coat layer and an intermediate layer.

Ferromagnetic metal thin films in which almost all the metal atoms constituting the magnetic layer are cobalt have heretofore been considered to be excellent in magnetic properties but inferior in weathering resistance and unfavorable in terms of running properties and durability in practical use. However, the use of a lubricant layer as in the present invention makes it possible to produce a magnetic recording medium which is excellent in corrosion resistance, running properties and durability, and which is satisfactorily fit for practical use even if the ferromagnetic metal thin film has a chemical composition in which not less than 90% of the metal atoms is cobalt, as described above.

As a non-magnetic base used in the present invention, a synthetic resin film having a thickness of from 3 $\mu$m to 10 $\mu$m is preferably used. Examples include polyethylene terephthalate, polyethylene naphthalate, polyimide, polyamide, and polyamide-imide. With a view to improving running properties, it is preferable to apply an inorganic filler having a particle diameter of from 5 nm to 20 nm to the surface of the non-magnetic base. The non-magnetic base may also be arranged so that such a filler is contained inside the base, and irregularities are formed on the surface of the non-magnetic base.

The magnetic recording medium of the present invention can be further improved in running properties and durability by providing a back coat layer of a coating film consisting essentially of a non-magnetic powder and a binder resin on the surface of the non-magnetic base on the side reverse to the side where the magnetic layer is formed. Since the ferromagnetic metal thin film can retain only a limited amount of lubricant on the surface or inside thereof, if the back coat layer has previously been impregnated with the lubricant, a deficiency of lubricant can be filled with the lubricant supplied from the back coat layer, advantageously. More specifically, when the tape-shaped magnetic recording medium is wound up, the back coat layer and the magnetic layer come in contact with each other, thereby enabling the lubricant to be supplied to the magnetic layer.

As a non-magnetic powder for forming a back coat layer, various kinds of inorganic pigment and carbon black can be used. As a binder resin, it is possible to use various kinds of binder resin which are generally employed for coating type magnetic layers, e.g. nitrocellulose, phenoxy resin, vinyl chloride resin, polyurethane, etc.

In the magnetic recording medium of the present invention, further, a perfluoro polyether may be jointly used as a lubricant compound. Examples of perfluoro polyethers usable in the present invention include perfluoromethylene oxide, perfluoroethylene oxide polymer, perfluoro-n-propylene oxide polymer $(CF_2CF_2CF_2O)_n$, perfluoroisopropylene oxide polymer $(CF(CF_3)CF_2O)_n$, and copolymers of these polymers. Perfluoro polyethers used in the present invention may contain a polar group, e.g. an alcohol, a methyl ester group, etc. Specific examples are CRYTOX143AZ and 157SL, manufactured by Du Pont Co., Ltd., FOMBLINZ-DOL and Z-DEAL, manufactured by Montefluos, and so forth.

When a perfluoro polyether is to be used, it may be mixed in a back coat layer coating solution in the same way as a fluorine-containing carboxylic acid ester compound. Alternatively, the perfluoro polyether may be mixed in a fluorine-containing carboxylic acid ester compound when the compound is to be coated on the back coat layer produced in advance.

In the present invention, it is also possible to use jointly a fluorinated hydrocarbon compound formed by replacing some hydrogen atoms in a hydrocarbon having no adsorptive functional group by fluorine atoms. The use of such a fluorinated hydrocarbon compound makes it possible to further improve the running durability under low-temperature and low-humidity environmental conditions. The fluorinated hydrocarbon has from 14 to 40 carbon atoms, preferably from 16 to 28 carbon atoms, more preferably from 18 to 24 carbon atoms, in which some hydrogen atoms have been replaced by fluorine atoms. If the number of carbon atoms is excessively large, crystallizability increases, causing still durability and repeated running durability to be deteriorated. If the number of carbon atoms is excessively small, the volatility becomes unfavorably high, which may cause the characteristics to deteriorate with time.

Regarding the ratio of fluorine atoms in the carbon chain, the ratio of the number of hydrogen atoms to the number of fluorine atoms is preferably in the range of from 3:1 to 1:2. If the ratio of the number of fluorine atoms to the number of hydrogen atoms is excessively high, the solubility in an ordinary hydrocarbon solvent containing no fluorine atom and coatability may be impaired.

The fluorinated hydrocarbon in the present invention may be a straight-chain, saturated hydrocarbon in which either or both of the terminals have been replaced by fluorine, or which has a branched structure, or which has an unsaturated bond. Thus, various kinds of fluorinated hydrocarbon may be used.

Specific examples are $CF_3(CF_2)_9(CH_2)_{15}CH_3$, $CF_3(CF_2)_7(CH_2)_{17}CH_3$, $CF_3(CF_2)_7(CH_2)_6(CF_2)_7CF_3$, $(CF_3)_7CF(CF_2)_4(CH_2)_{15}CH_3$, $(CF_3)_2CF(CF_2)_4(CH_2)_8(CF_2)_4CF(CF_3)_2$, etc.

Among them, preferable compounds are those which have fluorinated hydrocarbon groups at both terminals, or those which have a branched, fluorinated hydrocarbon group at either or each terminal. Such hydrocarbon compounds are superior in fluid lubricating properties.

Although the magnetic recording medium of the present invention has excellent anticorrosion properties, the corrosion resistance can be further enhanced by jointly using a heterocyclic rust preventive. Examples of rust preventives usable in the present invention include nitrogen-containing heterocyclic compounds, e.g. benzotriazole, benzimidazole, purine, pyrimidine, etc., derivatives obtained by introducing an alkyl side chain or the like into the nuclei of these nitrogen-containing heterocyclic compounds, nitrogen- or sulfur-containing heterocyclic compounds, e.g. benzothiazole, 2-mercaptobenzothiazole, a tetrazinedene cyclic compound, a thiouracil compound, etc., and derivatives of these compounds.

Examples of tetrazinedene cyclic compounds usable for this purpose are those which are represented by the following formula:

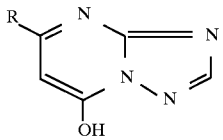

where R is a hydrocarbon group selected from among an alkyl group, an alkoxy group, and an alkylamide group.

Tetrazinedene cyclic compounds having from 3 to 20 carbon atoms are particularly preferable. In the case of an alkoxy group, R in $ROCOCH_2$— may be $C_3H_7$—, $C_6H_{13}$—, or phenyl. In the case of an alkyl group, R may be $C_6H_{13}$—, $C_9H_{19}$—, or $C_{17}H_{35}$—. In the case of an alkylamide group, R in $RNHCOCH_2$— may be phenyl, or $C_3H_7$—.

Examples of thiouracil cyclic compounds are those which are represented by the following formula:

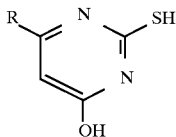

where R is a hydrocarbon group having not less than 3 carbon atoms.

The coating weight of the rust preventive is preferably in the range of from 0.01 to 5.0 mg/m² with respect to 1.0 to 50 mg/m² of lubricant. Particularly preferably, the coating weight of the rust preventive is in the range of from 0.1 to 10 mg/m² with respect to 3 to 30 mg/m² of lubricant.

As has been described above, the magnetic recording medium of the present invention has a magnetic layer of a ferromagnetic metal thin film formed over at least one surface of a non-magnetic base, with or without an inorganic protective film stacked on the magnetic layer. In the magnetic recording medium, a surface layer consisting essentially of a salt of a phosphoric alkyl ester compound with an alkylamine compound, and a fluorine-containing carboxylic acid ester compound is present on the ferromagnetic metal thin magnetic film or on the inorganic protective film. Since the salt of a phosphoric alkyl ester compound with an alkylamine compound is readily adsorbed on an inorganic protective film, e.g. a carbon protective film, it performs a high degree of extreme pressure lubrication. Consequently, it is possible to improve the durability and corrosion resistance of the magnetic recording medium. Further, the magnetic recording medium suffers minimal deterioration of the running durability after storage under high-temperature and high-humidity environmental conditions in comparison to a magnetic recording medium which uses only a phosphoric alkyl ester compound, and thus high reliability can be obtained. Further, by using the above-described fluorine-containing carboxylic acid ester compound in combination with the salt of a phosphoric alkyl ester compound with an alkylamine compound, it is possible to obtain fluid lubricating properties based on the behavior of non-adsorption molecules on the adsorption film of the salt. The advantageous effect is particularly remarkable under low-temperature and low-humidity environmental conditions.

The present invention will be explained below more specifically by way of Examples of the present invention and Comparative Examples.

EXAMPLES AND COMPARATIVE EXAMPLES

On a polyethylene terephthalate film of 10 μm in thickness having a spherical silica filler of 13 nm in particle diameter on the surface thereof, cobalt was obliquely deposited to a thickness of 70 nm twice in an oxygen-containing atmosphere so that the incidence angle of a magnetic metal vapor stream to the polyethylene terephthalate film was 45°, thereby obtaining a ferromagnetic metal film consisting of two magnetic layers having a total thickness of 140 nm. It should be noted that the thin films constituting the two layers were formed so that columnar crystals of ferromagnetic metal constituting the thin films were inclined in the same direction. Thereafter, heat treatment was carried out for uncurling. Then, a carbon protective film was formed on the magnetic layer by a plasma CVD method as follows:

Methane was supplied at a flow rate of 150 sccm as a raw material gas, and argon was supplied at a flow rate of 50 sccm as a carrier gas. Further, a radio-frequency power of 600 W was applied, and a DC voltage of –400 V was applied to the magnetic layer surface through a pass roller. In addition, a DC voltage of +500 V was applied to an anode installed in the gas inlet, thereby accelerating the plasma generated, and thus forming a rigid carbon protective film of diamond-like carbon on the surface of the magnetic layer at a temperature of 20° C. and at a transfer speed of 5 m/min.

The carbon protective film thus obtained had a film thickness of 80 nm, and it was confirmed by Raman spectroscopy that the carbon protective film was diamond-like carbon. The Vickers hardness of the carbon protective film formed by this method was 2,200 kg/mm².

Further, a back coat layer having a thickness of 0.5 μm was formed on the surface of the film on the side reverse to the side where the magnetic layer was formed by using a back coat layer coating solution having the following composition:

| (Back coat layer coating solution) | |
|---|---|
| Carbon black Calcalb N-990 (manufactured by Cancalb; average particle diameter: 270 nm) | 3 parts by weight |
| Black Pearls 800 (manufactured by Cabot Corp.; average particle diameter: 17 nm) | 97 parts by weight |
| Nitrocellulose RS1/2H (manufactured by Daicel Ltd.) | 60 parts by weight |
| Polyurethane N-2304 (manufactured by Nippon Polyurethane Co., Ltd.) | 60 parts by weight |
| Polyisocyanate Coronate L (manufactured by Nippon Polyurethane Co., Ltd.) | 20 parts by weight |
| Methyl ethyl ketone | 1,000 parts by weight |

Next, a mixed ethanol solution of a salt of a phosphoric alkyl ester compound with an alkylamine compound and a fluorine-containing carboxylic acid ester, shown in Table 1, was coated on a coated surface at a coating weight, as shown in Table 1, by a wire bar method and then dried. The resulting magnetic recording medium was slit into a tape of 8 mm in width, which was then incorporated into a cassette half for 8-mm VTR, thereby preparing each sample for evaluation. In the tables, "(Comp.)" attached to Sample No. denotes a comparative example. Further, "n" in Sample No. 10 denotes a perfluoro polyether chain having a molecular weight of about 2,000. Sample No. 20 also shows a perfluoro polyether chain having a molecular weight of about 2,000. Sample No. 21 shows a perfluoro polyether chain having a molecular weight of about 1,800.

TABLE 1

| Sample Nos. | Coated salt of phosphoric alkyl ester with alkylamine Coated fluorine-containing carboxylic acid ester compound | Coating weight mg/m² | Coated surface |
|---|---|---|---|
| | (part 1) | | |
| 1 | $CH_3(CH_2)_{11}OPO_3H.H_3N(CH_2)_{17}CH_3$ | 2 | Carbon protective film |
| | $CF_3(CF_2)_7(CH_2)_2COO(C_2H_5O)(CH_2)_{11}CH_3$ | 4 | Carbon protective film |
| 2 | $CH_3(CH_2)_{11}OPO_3H.H_3N(CH_2)_{17}CH_3$ | 2 | Carbon protective film |
| (Comp.) | No fluorine-containing carboxylic acid ester compound was coated | 0 | |
| 3 | No salt of phosphoric alkyl ester with alkylamine was coated | 0 | |
| (Comp.) | $CF_3(CF_2)_7(CH_2)_2COO(C_2H_5O)_3(CH_2)_{11}CH_3$ | 4 | Carbon protective film |
| 4 | $CH_3(CH_2)_{10}COO.H_3N(CH_2)_{17}CH_3$ | 2 | Carbon protective film |
| (Comp.) | $CF_3(CF_2)_7(CH_2)_2COO(C_2H_5O)_3(CH_2)_{11}CH_3$ | 4 | Carbon protective film |
| 5 | Neither of two materials was coated | — | |
| (Comp.) | | | |
| 6 | $(CH_3(CH_2)_{11}O)_2PO_2.H_3N(CH_2)_{17}CH_3$ | 2 | Carbon protective film |
| | $CF_3(CF_2)_7(CH_2)_2COO(C_2H_5O)_3(CH_2)_{11}CH_3$ | 4 | Carbon protective film |
| 7 | $CH_3(CH_2)_{11}OPO_3H.H_3N(CH_2)_{17}CH_3$ | 2 | Carbon protective film |
| | $CF_3(CF_2)_7(CH_2)_2COO(C_2H_5O)_3(CH_2)_{11}CH_3$ | 4 | Back coat layer |
| 8 | $CH_3(CH_2)_{11}OPO_3H.H_3N(CH_2)_{17}CH_3$ | 2 | Carbon protective film |
| | $CH_3(CH_2)_{16}COO(CH_2)_2(CF_2)_7CF_3$ | 4 | Back coat layer |
| 9 | $CH_3(CH_2)_{11}OPO_3H.H_3N(CH_2)_{17}CH_3$ | 2 | Carbon protective film |
| | $CF_3(CH_2)_4CH=CHCH_2CH=CH(CH_2)_7COO(CH_2)_2(CF_2)_7CH_3$ | 4 | Back coat layer |
| 10 | $CH_3(CH_2)_{11}OPO_3H.H_3N(CH_2)_{17}CH_3$ | 2 | Carbon protective film |
| | $CH_3(CH_2)_{17}COOCH_2(OCF_2CF_2CF_2)_nOCF_2CF_2CF_3$ | 4 | Back coat layer |
| 11 | $CH_3(CH_2)_{11}OPO_3H.H_3N(CH_2)_{17}CH_3$ | 2 | Carbon protective film |
| | $CF_3(CF(CF_3)CF_2O)_{10}CF(CF_3)CF_2COO(CH_2)_{17}CH_3$ | 4 | Back coat layer |
| | (part 2) | | |
| 12 | $CH_3(CH_2)_{15}OPO_3H.H_3N(CH_2)_{17}CH_3$ | 2 | Carbon protective film |
| | $CF_3(CF_2)_7(CH_2)_2COO(C_2H_5O)_3(CH_2)_{11}CH_3$ | 4 | Back coat layer |
| 13 | $CH_3(CH_2)_{15}OPO_3H.H_3N(CH_2)_2(CF_2)_7CF_3$ | 2 | Carbon protective film |
| | $CF_3(CF_2)_7(CH_2)_2COO(C_2H_5O)_3(CH_2)_{11}CH_3$ | 4 | Back coat layer |
| 14 | $CH_3(CF_2)_7(CH_2)_2OPO_3H.H_3N(CH_2)_{17}CF_3$ | 2 | Carbon protective film |
| | $CF_3(CF_2)_7(CH_2)_2COO(C_2H_5O)_3(CH_2)_{11}CH_3$ | 4 | Back coat layer |
| 15 | $CH_3(CF_2)_7(CH_2)_2OPO_3.(H_3N(CH_2)_{17}CH_3)_2$ | 2 | Carbon protective film |
| | $CF_3(CF_2)_7(CH_2)_2COO(C_2H_5O)_3(CH_2)_{11}CH_3$ | 4 | Back coat layer |
| 16 | No salt of phosphoric alkyl ester with alkylamine was coated | 0 | |
| (Comp.) | $CF_3(CF_2)_7(CH_2)_2COO(C_2H_5O)_3(CH_2)_{11}CH_3$ | 4 | Back coat layer |
| 17 | $CH_3(CH_2)_{10}COO.H_3N(CH_2)_{17}CH_3$ | 2 | Carbon protective film |
| (Comp.) | $CF_3(CF_2)_7(CH_2)_2COO(C_2H_5O)_3(CH_2)_{11}CH_3$ | 4 | Back coat layer |
| 18 | $CH_3(CH_2)_{15}OPO_3H_3$ | 2 | Carbon protective film |
| (Comp.) | $CF_3(CF_2)_7(CH_2)_2COO(C_2H_5O)_3(CH_2)_{11}CH_3$ | 4 | Back coat layer |
| 19 | $CH_3(CH_2)_{17}NH_2$ | 2 | Carbon protective film |
| (Comp.) | $CF_3(CF_2)_7(CH_2)_2COO(C_2H_5O)_3(CH_2)_{11}CH_3$ | 4 | Back coat layer |
| 20 | $CH_3(CH_2)_{11}OPO_3H.H_3N(CH_2)_{17}CH_3$ | 2 | Carbon protective film |
| (Comp.) | $HOCH_2(CF_2O)_m(CF_2CF_2O)_nCH_2OH$ FOMBLIN Z-DOL | 4 | Back coat layer |
| 21 | $CH_3(CH_2)_{11}OPO_3H.H_3N(CH_2)_{17}CH_3$ | 2 | Carbon protective film |
| (Comp.) | $CF_3(CF(CF_3)CF_2O)_{10}CF(CF_3)CF_3$ KRYTOX 143AZ | 4 | Back coat layer |

Each magnetic recording medium sample obtained as described above was measured for the coefficient of friction, still durability, repeated running durability and corrosion resistance under the following conditions. The results of the measurement are shown in Table 2.

[Evaluation Method]
1. Measurement of Coefficient of Friction ($\mu$ value)

Each magnetic recording medium was brought into contact with a stainless steel pole (material: SUS420J) at a winding angle of 180° under a tension ($T_1$) of 20 g at 23° C. and 70% RH. A tension ($T_2$) required to run the magnetic tape at a speed of 3.3 cm/sec. under the above-described conditions was measured, and the friction coefficient $\mu$ of the magnetic tape was determined from the following formula on the basis of the measured value:

$$\mu = 1/\pi . 1n \ (T_2/T_1)$$

2. Measurement of Still Durability
(Condition A)

A color bar image was recorded at a running tension of 20 g by using an 8-mm VTR (FUJIX-M6, a product of Fuji Photo Film Co., Ltd.) under the environmental conditions of 23° C. and 10% RH. Then, the recorded image was reproduced in the still mode with the still limiting mechanism left inoperative, and a time taken until the output reached −6 dB with respect to the initial output was measured to evaluate the still durability.
(Condition B)

A color bar signal was recorded by using a commercially available 8-mm VTR (FUJIX-V88, a product of Fuji Photo Film Co., Ltd.) at −10° C. Then, the recorded image was reproduced in the still mode with the still limiting mechanism left inoperative, and a time taken until the output reached −6 dB with respect to the initial output was measured to evaluate the still durability.
(Condition C)

A color bar signal was recorded by using an 8-mm VTR (EV-S700, a product of Sony Corporation) with the number of revolutions of the recording head cylinder set twice as large as the ordinary number of revolutions under the environmental conditions of 5° C. and 10% RH. Then, the recorded image was reproduced in the still mode with the still limiting mechanism left inoperative, and a time taken until the output reached −6dB with respect to the initial output was measured to evaluate the still durability.

3. Evaluation of Repeated Running Durability

A single-wave signal of 7.6 MHz was recorded for 60 minutes by using an 8-mm VTR (EV-S1500, a product of Sony Corporation) under the environmental conditions of 23° C. and 10% RH, and then the recorded signal was continuously reproduced 100 times. A change in output and head contamination after playback had been performed 100 times were examined. Head contamination was evaluated as follows:

"Excellent" . . . no contamination was observed on either of the sliding and non-sliding portions of the head;

"No good" . . . contamination was clearly observed on the sliding portion; and

"Good" . . . results of examination other than the above.

4. Corrosion Resistance

Visual evaluation:

Each magnetic recording medium was stored for 72 hours with the surface thereof exposed to environmental conditions of 27° C., 80% RH and sulfurous acid gas content of 1 ppm. After the storage, the surface of the tape was visually observed to evaluate the corrosion resistance as follows:

"No corrosion" . . . there was no substantial change during the storage;

"Corroded" . . . corrosion was observed, although metallic luster was left on the whole surface of the tape; and "Dissolved" . . . part or the whole of the magnetic layer was corroded away.

Evaluation of shelf stability by $\mu$ value:

Each magnetic recording medium was stored for one week with the surface thereof exposed to environmental conditions of 60° C. and 90% RH. After the storage, the coefficient of friction was measured in the same way as in the above 1.

The magnetic recording medium of the present invention has a protective film which provides a high degree of shelf stability, running properties and durability, which have heretofore been unattainable by the conventional lubricants, thus realizing a high-density magnetic recording medium. In the magnetic recording medium of the present invention, a surface layer consisting essentially of a salt of a phosphoric alkyl ester compound with an alkylamine compound, and a fluorine-containing carboxylic acid ester compound is formed on a ferromagnetic metal thin film or on an inorganic protective film stacked thereon. Therefore, it is considered that the salt of a phosphoric alkyl ester compound with an alkylamine compound performs extreme pressure lubrication under severe sliding conditions because it is readily adsorbed on a protective film, e.g. a carbon protective film, and it has a phosphoric acid group in a molecule thereof. Accordingly, it is possible to improve the durability and corrosion resistance of the magnetic recording medium. Further, the magnetic recording medium suffers minimal deterioration of the running durability after storage under high-temperature and high-humidity environmental conditions in comparison to a magnetic recording medium which uses only a phosphoric alkyl ester compound, and thus high reliability can be obtained. The reason for this is considered as follows: Even if the phosphoric alkyl ester compound in the salt is hydrolyzed under high-temperature and high-humidity environmental conditions, the alkylamine compound is not hydrolyzed, and thus it contributes to lubrication.

Further, by using the above-described fluorine-containing carboxylic acid ester compound in combination with the salt of a phosphoric alkyl ester compound with an alkylamine compound, it is possible to obtain fluid lubricating properties based on the behavior of non-adsorption molecules on the adsorption film of the salt. The advantageous effect is particularly remarkable under low-temperature and low-humidity environmental conditions.

TABLE 2

| Sample Nos. | $\mu$ value | Still durability (min) Cond. A | Cond. B | Cond. C | Output change (dB) | Head contamination | Corrosion resistance Visual evaluation | Shelf stability ($\mu$ value) |
|---|---|---|---|---|---|---|---|---|
| 1 | 0.25 | >120 | >120 | 79 | −2.4 | Good | No corrosion | 0.28 |
| 2 (Comp.) | 0.26 | >120 | 68 | 15 | <−6 | No good | No corrosion | 0.29 |
| 3 (Comp.) | 0.31 | 15 | 8 | 5 | −3.9 | No good | Dissolved | 0.39 |
| 4 (Comp.) | 0.26 | 9 | 5 | 5 | <−6 | No good | Corroded | 0.29 |
| 5 (Comp.) | >0.5 | 2 | 1 | 1 | <−6 | No good | Dissolved | >0.5 |
| 6 | 0.28 | >120 | >120 | >120 | −1.1 | Good | No corrosion | 0.31 |
| 7 | 0.23 | >120 | >120 | >120 | −1.5 | Good | No corrosion | 0.25 |
| 8 | 0.24 | >120 | >120 | >120 | −1.9 | Good | No corrosion | 0.27 |
| 9 | 0.26 | >120 | >120 | >120 | −2.5 | Good | No corrosion | 0.3 |
| 10 | 0.28 | >120 | >120 | >120 | −2 | Good | No corrosion | 0.32 |
| 11 | 0.28 | >120 | >120 | >120 | −2.1 | Good | No corrosion | 0.32 |
| 12 | 0.25 | >120 | >120 | >120 | −2.5 | Good | No corrosion | 0.28 |
| 13 | 0.24 | >120 | >120 | >120 | −2 | Good | No corrosion | 0.29 |
| 14 | 0.23 | >120 | >120 | >120 | −1.5 | Good | No corrosion | 0.25 |
| 15 | 0.29 | >120 | >120 | >120 | −2.8 | Good | No corrosion | 0.32 |
| 16 (Comp.) | 0.33 | 30 | 14 | 5 | −4.1 | No good | Dissolved | 0.4 |
| 17 (Comp.) | 0.25 | 21 | 12 | 3 | −5.9 | No good | No corrosion | 0.32 |
| 18 (Comp.) | 0.26 | >120 | 90 | 59 | −3.9 | No good | No corrosion | 0.39 |
| 19 (Comp.) | 0.32 | 5 | 2 | 2 | <−6 | No good | Dissolved | 0.35 |
| 20 (Comp.) | 0.32 | >120 | 78 | 55 | −3.1 | Good | Corroded | 0.36 |
| 21 (Comp.) | 0.35 | >120 | >120 | >120 | −3.8 | Good | Dissolved | 0.4 |

What we claim is:

1. A magnetic recording medium having a magnetic layer of a ferromagnetic metal thin film formed over at least one surface of a non-magnetic base, said magnetic recording medium comprising ferromagnetic metal thin film coated by a protective layer consisting of a carbon film, and a surface layer consisting essentially of a salt of a phosphoric alkyl ester compound with an alkylamine compound, which is represented by the following formula (1) or (2), and a fluorine-containing carboxylic acid ester compound, and comprising a back coat layer provided on a side of said non-magnetic base which is reverse to a side on which said ferromagnetic metal thin film is provided, said back coat layer containing said fluorine-containing carboxylic acid ester, said surface layer being present on said carbon film over said ferromagnetic metal thin film:

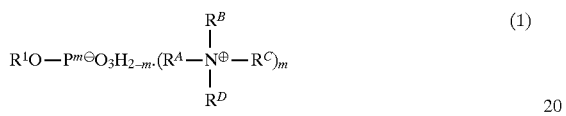
(1)

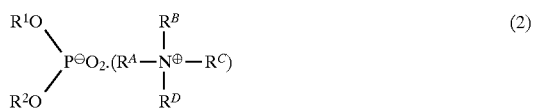
(2)

where: $R^1$ and $R^2$, which may be the same or different from each other, are a hydrocarbon or fluorinated hydrocarbon group having from 2 to 26 carbon atoms; $R^A$, $R^B$, $R^C$ and $R^D$ are hydrogen, or a hydrocarbon or fluorinated hydrocarbon group having not more than 26 carbon atoms; and m is 1 or 2.

2. A magnetic recording medium according to claim 1, wherein said fluorine-containing carboxylic acid ester compound is selected from the group consisting of compounds which are represented by the following formulae (3) to (6):

$$R^3\text{—COO—}R^4 \quad (3)$$

$$R^5\text{—COO—}(R^7O)_n\text{—}R^6 \quad (4)$$

$$Rf\text{—COO—}R^8 \quad (5)$$

$$R^8\text{—COO—}CH_2\text{—}Rf \quad (6)$$

where: $R^3$ and $R^4$, which may be the same or different from each other, are a hydrocarbon group having from 8 to 26 carbon atoms; at least either one of $R^3$ and $R^4$ is a fluorinated hydrocarbon group in which some or all of hydrogen atoms have been replaced by fluorine atoms; $R^5$ is a hydrocarbon group having from 8 to 26 carbon atoms; $R^6$ is a hydrocarbon group having from 2 to 18 carbon atoms; at least either one of $R^5$ and $R^6$ is a fluorinated hydrocarbon group in which some or all of hydrogen atoms have been replaced by fluorine atoms; $R^7$ is a straight-chain or branched alkylene group having from 1 to 4 carbon atoms; n is an integer of from 1 to 18; Rf is a perfluoro polyether group having a molecular weight of from 1,000 to 3,000; and $R^8$ is a hydrocarbon group having from 8 to 28 carbon atoms.

* * * * *